United States Patent [19]

Backhouse et al.

[11] 4,427,820

[45] Jan. 24, 1984

[54] PRODUCTION OF POLYMER MICROPARTICLES AND COATING COMPOSITIONS CONTAINING THEM

[75] Inventors: Alan J. Backhouse, South Ascot; Stephen J. Thorne, Henley-on-Thames; Patrick A. Hunt, Welwyn Garden City, all of England

[73] Assignee: Imperial Chemical Industries PLC, London, England

[21] Appl. No.: 386,635

[22] Filed: Jun. 9, 1982

Related U.S. Application Data

[63] Continuation-in-part of Ser. No. 212,752, Dec. 4, 1980, abandoned.

[30] Foreign Application Priority Data

Dec. 21, 1979 [GB] United Kingdom ................ 7944210

[51] Int. Cl.³ ............................ C08J 3/02; C08J 3/08; C08K 5/01; C08L 51/08
[52] U.S. Cl. .................................... 524/504; 524/923; 525/63; 525/66; 525/69; 525/450
[58] Field of Search ................. 524/923, 504; 525/63, 525/66, 450, 69

[56] References Cited

U.S. PATENT DOCUMENTS

| 3,232,903 | 2/1966 | Schmidle et al. |
| 3,317,635 | 5/1967 | Osmond . |
| 3,399,164 | 8/1968 | Osmond . |
| 3,640,931 | 2/1972 | Clarke et al. |
| 3,717,605 | 2/1973 | Osmond et al. ...................... 524/923 |
| 3,729,451 | 4/1973 | Blecke et al. . |
| 3,745,137 | 7/1973 | Reid et al. ............................ 524/923 |
| 3,814,721 | 6/1974 | Maker et al. ......................... 524/923 |
| 4,048,422 | 9/1977 | Sackmann et al. ................... 526/203 |

FOREIGN PATENT DOCUMENTS 1374423 11/1974 United Kingdom ................ 524/923

OTHER PUBLICATIONS

Barrett, "Dispersion Polymerization in Organic Media," John Wiley & Sons, N.Y., 1975, pp. 134–143.

Primary Examiner—Allan Lieberman
Attorney, Agent, or Firm—Cushman, Darby & Cushman

[57] ABSTRACT

The production is described of a dispersion of polymer microparticles, which may optionally be crosslinked, by dispersion polymerisation in aliphatic hydrocarbon liquid under specified conditions of a monomer mixture which comprises up to 50% of styrene or a substituted derivative thereof and up to 50% by weight of a derivative of maleic acid or fumaric acid which is soluble in the hydrocarbon liquid at the polymerization temperature. The microparticles have a size in the range 100–400 nm and a high refractive index, and are suitable for incorporation in coating compositions which are based on a film-forming polymer, such as a thermosetting acrylic resin or an alkyd resin, containing a significant proportion of aromatic residues, and which are intended to be used either unpigmented or when containing only light-absorbing pigments.

24 Claims, No Drawings

PRODUCTION OF POLYMER MICROPARTICLES AND COATING COMPOSITIONS CONTAINING THEM

This invention relates to a process for making polymer microparticles, and to coating compositions containing the particles. This application is a continuation-in-part of Ser. No. 212,752 filed Dec. 4, 1980 and now abandoned.

The preparation of polymeric microparticles and their incorporation into coating compositions comprising a film-forming polymer have been described, for example in British Pat. Nos. 967,051; 1,242,051; 1,451,948 and 1,538,151; in U.S. Pat. Nos. 3,880,796; 3,996,667; 4,025,474; 4,055,607; 4,075,141; 4,115,472; 4,147,688; 4,180,489; 4,180,619; 4,206,099; 4,209,435; 4,220,679; 4,242,384; 4,268,547 and 4,294,735. In certain of these publications the particles in question are referred to as "microgel" particles, in which case the polymer of which the particles are composed is crosslinked to a greater or lesser extent and thereby rendered insoluble in any inert liquid diluent in which the film-forming polymer of the coating composition may be carried (although it may be swollen by that diluent). In other instances, the microparticles may be non-crosslinked and retain their identity in the coating composition by reason of the polymer of which they are composed being inherently insoluble in the diluent.

Such microparticles are conveniently made by processes of dispersion polymerisation of monomers in suitable liquids in the presence of polymeric stabilisers for the particles of polymer which are formed. The microparticles are thereby sterically stabilised against flocculation or aggregation, in the manner described in "Dispersion Polymerisation in Organic Media", ed. K. E. J. Barrett (John Wiley, 1975) and in many patent specifications such as British Specification Nos. 934,038; 941,305; 1,052,241; 1,122,397; 1,143,404 and 1,231,614.

Two types of such dispersion polymerisation process may be distinguished. In the first, which is described in British Pat. No. 1,451,948 referred to above, microgel particles are formed as a minor product of a dispersion polymerisation of ethylenically unsaturated monomers in the presence of a so-called "multifunctional" stabiliser. This stabiliser possesses the molecular structural features which are common to all sterically stabilising entities, namely a polymeric component of the molecule which is solvated by the continuous phase of the dispersion and another component which associates with the disperse phase; however, it possesses in addition a plurality of groupings which are capable of copolymerising with the monomers undergoing dispersion polymerisation. The main result of using such a stabiliser, as described more generally in British Patent Specification No. 1,231,614, is that the stabiliser becomes covalently linked to the disperse polymer, but a further consequence is that, whilst the greater part of the polymer formed as the disperse phase is non-crosslinked, a small part of it becomes crosslinked through the intervention of the copolymerisable groups in the stabiliser. By adding to the dispersion thus obtained a sufficient amount of an active solvent for the non-crosslinked disperse polymer, there can be produced a solution-type coating composition in which the non-crosslinked polymer constitutes the main film-forming material but in which the crosslinked microgel remains as insoluble, discrete and sterically stabilised particles. It is, however, difficult by this method to control the relative proportions of microgel and of non-crosslinked polymer which are produced, and also to control the molecular weight of the latter polymer (which may be desirable in order to optimise its film-forming properties) without adversely affecting the yield of microgel. Furthermore, it is, of course, inevitable that microgel made in this way will have essentially the same monomer composition as that of the non-crosslinked polymer.

In the second method of making microparticles, which is described in British Patent Specification No. 1,538,151 and in several of the United States specifications referred to earlier, the particles are produced essentially as the sole disperse material; here crosslinking is achieved through the expedient of having present in the monomer charge being polymerised pairs of comonomers carrying mutually chemically reactive groups (in addition to the copolymerisable groups) by reaction of which groups covalent cross-links between the polymer chains may be generated. A variety of combinations of mutually reactive groups has been proposed, for example epoxy and carboxyl, amine and carboxyl, epoxide and carboxylic anhydride, amine and carboxylic anhydride, hydroxyl and carboxylic anhydride, amine and carboxylic acid chloride, alkyleneimine and carboxyl, and organo-alkoxysilane and carboxyl. Since the microparticles made by this procedure are not accompanied by significant amounts of other polymeric products, they can conveniently be incorporated into coating compositions based on film-forming resins of any desired type and in any desired proportion.

One class of coating composition to which polymeric microparticles can with advantage be added is that based upon solutions of thermosetting acrylic resins; these are of particular interest for the painting of car bodies and other metal structures which can tolerate stoving at relatively high temperatures following application of the composition, whereby the composition is converted to a hard, insoluble coating through reaction of the resin with a crosslinking agent such as a melamine-formaldehyde resin. It is common practice to include in the monomers, from which these thermosetting acrylic resins are derived, a proportion of up to 40% by weight of styrene. This is done for two main reasons: firstly, because of the significantly higher refractive index of polystyrene as compared with that of most unmodified polymers of acrylic or methacrylic acid esters (1.59 and 1.46–1.49 respectively), the incorporation of styrene gives rise to a higher reflectance of light at the air-polymer interface and hence enhances the apparent gloss of the coating; secondly, copolymers containing some styrene show improved flow during the stoving operation in comparison with methyl methacrylate homopolymers. On the other hand, a practical upper limit, of about 50% by weight of total monomers, is set to the proportion of styrene by the strong ultraviolet light absorption properties of the latter and the consequent adverse effect on exterior durability of coatings containing it.

There are two general considerations affecting the incorporation of polymeric microparticles into coating compositions. The first is that the size of the particles must be carefully regulated, if the gloss of the coating is not to be adversely affected. In general, this means that the particles must not be of a size greater than about 400 nm; particles significantly larger than this will behave as matting or flatting agents. A high degree of gloss is, of course, very desirable for most applications, especially that of the painting of car bodies. The second consideration is that unless the refractive index of the microparticulate polymer is fairly closely matched to that of the main film-forming resin, there will be scattering of light at the boundary between the two polymer phases and the coating film will appear cloudy. This will, of course, be of little consequence in compositions containing light-scattering pigments such as titanium dioxide, but in coloured compositions of a deep hue containing light-absorbing pigments, particularly coloured metallic compositions containing a low level of aluminium flake, and above all in unpigmented compositions intended for the production of clear coatings, it can be a serious defect. Where a thermosetting copolymer contains a significant proportion of styrene, incorporation of microparticles consisting essentially of polymethyl methacrylate will have this undesirable result; the problem tends to be accentuated by the fact that the melamine-formaldehyde resins which are most commonly used as crosslinking agents in such systems themselves have relatively high refractive indices (in the region of 1.52).

When microgel particles are produced by the first of the two dispersion polymerisation techniques described above, it follows that the microgel polymer will always have approximately the same monomer composition as the main film-forming polymer which is produced along with it, so that the above-mentioned refractive index problem does not arise. A disadvantage of this first-described technique additional to those already mentioned is, however, that the very polymers which it is desired to use as the main film-former in many clearcoat compositions and compositions of high solids content are not readily prepared by non-aqueous dispersion polymerisation. For a variety of reasons, such polymerisation is most conveniently carried out in low polarity organic liquids, in particular aliphatic hydrocarbons, and, whilst polymers based wholly or overwhelmingly upon methyl methacrylate are practically insoluble in these liquids, copolymers containing other monomers, such as styrene, in significant proportions may be appreciably soluble in them. This may make it difficult to obtain initially a stable dispersion of the copolymer.

The foregoing discussion has considered the problems which arise where the main film-forming polymer is of the addition type, i.e. is one derived from ethylenically unsaturated monomers. However, the same need to limit the size of the microgel particles and to match their refractive index to that of the film-former may arise in the case of the use of certain alkyd or polyester resins in the latter capacity, more specifically those alkyd resins which are derived in part from aromatic starting materials, such as phthalic anhydride, and which in consequence have relatively high refractive indices. Here again, there may be used as crosslinking agents melamine-formaldehyde resins also having high refractive indices.

The evident answer to the refractive index problem, whatever the nature of the film-forming polymer into which the microgel polymer is incorporated, is to make microgel polymer which contains a substantial proportion of styrene by the second of the two dispersion polymerisation methods referred to. However, as indicated above, the dispersion polymerisation of styrene in an aliphatic hydrocarbon using free radical catalysts presents certain other problems: the polymerisation proceeds slowly and the polymer formed is heavily swollen by the hydrocarbon at the polymerisation temperature normally employed, so that a coarse particle-size dispersion of little value in the present context results (see "Dispersion Polymerisation in Organic Media", ed. K. E. J. Barrett: John Wiley, London 1975: pages 213–214). These problems are encountered equally in the case of monomer mixtures containing a substantial proportion of styrene, for example greater than 20% by weight.

It is known that styrene copolymerises with maleic anhydride more rapidly and smoothly than it undergoes homopolymerisation, and the dispersion polymerisation of mixtures of styrene and maleic anhydride in a hydrocarbon medium is described, for example, in U.S. Pat. No. 3,232,903. However, the polymerisation procedure described in that patent is of the "one-shot" type in which the monomer to be polymerised is introduced all at once into the reaction mixture; that is, in fact, an essential method of operation when using the monomer mixture in question since the necessary dissolution of the maleic anhydride in the reaction medium depends upon the presence of a high concentration of styrene monomer. A general consequence of the use of the "one-shot" procedure is poor control of the particle size of the resulting copolymer dispersion, because the high concentration of monomer also increases the solvency of the reaction medium for the polymer formed, preventing a "clean" precipitation of particles.

We have now found that dispersion polymerisation in aliphatic hydrocarbon of monomer mixtures containing a substantial proportion of styrene can be carried out without these difficulties if the monomer mixture additionally contains a derivative of maleic acid or fumaric acid which is per se soluble in the hydrocarbon at the polymerisation temperature, and if the monomer mixture is fed into the hydrocarbon at such a rate that the solvency of the reaction medium for the polymer formed is not significantly increased.

According to the present invention we provide a process for the production of a dispersion of addition polymer microparticles of a size in the range of 100–400 nm, the process comprising the dispersion polymerisation in an aliphatic hydrocarbon liquid of an ethylenically unsaturated monomer mixture which gives rise to a copolymer insoluble in the hydrocarbon liquid and which comprises (i) up to 50% by weight of styrene or a substituted derivative thereof and (ii) up to 50% by weight of a derivative of maleic acid or fumaric acid which is per se soluble in the hydrocarbon liquid at the temperature of polymerisation, the polymerisation being carried out in the presence in the hydrocarbon liquid of a steric dispersion stabiliser the molecule of which comprises at least one polymeric component which is solvated by the hydrocarbon liquid and at least one other component which is not solvated by the liquid and is capable of associating with the copolymer produced, and the concentration of unpolymerised monomer in the hydrocarbon liquid being regulated so that throughout the polymerisation the reaction medium remains a non-solvent for the copolymer formed.

Any derivative of maleic acid of fumaric acid which is soluble in the aliphatic hydrocarbon liquid is suitable for use in the process of the invention. This solubility requirement excludes maleic acid and fumaric acid themselves, and also maleic anhydride, but a variety of compounds derived from these, for example through reaction of the carboxyl groups, are suitable. A preferred type of derivative is one containing in the molecule at least one aromatic group, since the presence of the aromatic nucleus provides an enhancement of the refractive index of the microparticle additional to that afforded by the copolymerised styrene or styrene derivative.

One class of derivative of maleic acid or fumaric acid containing at least one aromatic nucleus which is especially suitable is the class of N-aryl-substituted maleimides of the general formula

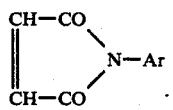

where Ar is an aromatic radical which may contain a single benzene nucleus or two or more connected to fused benzene nuclei and which may optionally carry other substituent groups. Such compounds are in general soluble in aliphatic hydrocarbons. Examples of members of this class include N-phenylmaleimide, N-o-tolylmaleimide, N-m-tolylmaleimide, N-p-tolylmaleimide, N-o-biphenylylmaleimide, N-p-biphenylylmaleimide, N-p-(tert-butyl)phenylmaleimide, N-p-dodecylphenylmaleimide, N-α-naphthylmaleimide, N-β-naphthylmaleimide, N-o-chlorophenylmaleimide, N-m-chlorophenylmaleimide, N-p-chlorophenylmaleimide, N-p-methoxyphenylmaleimide, N-2-methyl-4-chlorophenylmaleimide, N-2-methoxy-5-chlorophenylmaleimide, N-4-phenoxyphenylmaleimide, N-4-phenylcarboxypenylmaleimide, N-4-(o-chlorophenoxy)phenylmaleimide, N-2,5-dichlorophenylmaleimide, N-2,5-dimethoxyphenylmaleimide and N-2,4,5-trichlorophenylmaleimide. Any of the foregoing substances may be made by the processes described in British Patent Specification Nos. 1,040,907 and 1,041,027.

Another class of derivative of maleic acid or fumaric acid containing at least one aromatic nucleus which is soluble in aliphatic hydrocarbons and is suitable for use according to the invention is the class of diesters of maleic acid or fumaric acid of the structure

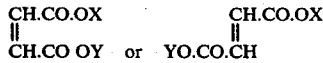

where either X or Y, or both, is an aromatic radical which may contain a single benzene nucleus or two or more connected or fused benzene nuclei and which may optionally carry other substituent groups. Examples of members of this class include diphenylmaleate, methyl phenyl maleate, dibenzylmaleate, di-(o-chlorobenzyl) maleate, di(p-chlorobenzyl)maleate, benzyl methyl maleate, dinaphthyl maleate, bis(diphenylyl)maleate, diphenyl fumarate, methyl phenyl fumarate and other fumaric esters corresponding to the foregoing maleic esters.

Also useful in the process of the invention are the corresponding mono-esters of maleic acid or fumaric acid having the structure

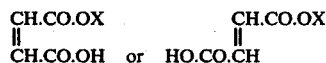

where X has the same significance as above. Suitable members of this class include monophenyl maleate, monobenzylmaleate, mono-(o-chlorobenzyl)maleate, mono-(p-chlorobenzyl)maleate and mononaphthyl maleate.

Yet another class of suitable, aliphatic hydrocarbon-soluble derivative of maleic acid or fumaric acid comprises the diesters of those acids of the structure

where R and $R_1$, which may be the same or different, are alkyl radicals containing two or more carbon atoms. Examples of compounds of this class include diethyl maleate, diethyl fumarate, dibutyl maleate, dibutyl fumarate, dioctyl maleate, dioctyl fumarate, di-isooctyl maleate, di-isooctyl fumarate, dicyclohexyl maleate and dicyclohexyl fumarate.

Derivatives of styrene which may be employed according to the invention instead of, or in addition to to, styrene itself include α-methylstyrene, o-. m- and p-vinyltoluenes, p-tert-butylstyrene and o-, m- and p-chlorostyrenes.

As defined above, the addition polymer microparticles are insoluble in the aliphatic hydrocarbon liquid and consequently precipitate out therefrom as they are formed during the dispersion polymerisation; the particles are maintained in a state of stable dispersion by the steric stabiliser present. Insolubility of the microparticles may be achieved in either of two ways. Firstly, the choice of the monomers from which the microparticulate polymer is derived may be such that the polymer is inherently insoluble in the hydrocabon liquid. In this case, the monomer mixture to be polymerised will usually include one or more ethylenically unsaturated monomers in addition to the monomers specified above. Such monomers may in particular be the acrylic monomers, that is to say the alkyl esters of acrylic acid or methacrylic acid, such as methyl methacrylate, ethyl methacrylate, propyl methacrylate, butyl methacrylate, lauryl methacrylate, ethyl acrylate, butyl acrylate, hexyl acrylate, n-octylacrylate, 2-ethylhexyl acrylate, nonyl acrylate, lauryl acrylate and cetostearyl acrylate. Furthermore, there may be included other "neutral" monomers not of the acrylic type, for example vinyl acetate, vinyl propionate or acrylonitrile. Secondly, insolubility of the microparticles may be achieved by introducing a sufficient degree of crosslinking into a polymer which, if it were not crosslinked, would actually be soluble in the aliphatic hydrocarbon. Such crosslinking can be effected, for example, by including in the monomers to be polymerised a monomer which is difunctional or polyfunctional with respect to the polymerisation reaction. Examples of such monomers include an acrylic or methacrylic ester of a diol or polyol, e.g. ethylene glycol dimethacrylate or trimethylolpropane trimethacrylate, a difunctional or polyfunctional vinyl-aromatic compound, e.g. divinylbenzene, an ester of acrylic acid or methacrylic acid with an unsaturated alcohol, e.g. allyl methacrylate, a diallyl ester of a dicarboxylic acid, e.g. diallyl succinate, diallyl adipate or diallyl phthalate, a di- or poly-allyl ether of a glycol or polyhydric alcohol, e.g. ethylene glycol diallyl ether, glycerol triallyl ether or pentaerythritol tetraallyl ether, or triallyl isocyanurate. Alternatively, crosslinking may be achieved by including in the monomers to be polymerised pairs of monomers containing functional groupings which are mutually reactive by a condensation reaction. Examples of such pairs of monomers include epoxy group-containing and carboxyl group-containing monomers, such as glycidyl methacrylate and methacrylic acid or glycidyl acrylate and acrylic acid; or hydroxymethylamino- or alkoxymethylamino- group-containing and carboxyl group-containing monomers, as described in our published British Application No. 2051830A As a further alternative, crosslinking may be brought about by carrying out the polymerisation of the monomers in the presence of a reactive amino resin which is insoluble in the aliphatic hydrocarbon liquid, the monomers in this case including at least one bearing a group capable of reacting with the amino resin, such as a hydroxyl or a carboxyl group. This last-mentioned procedure is described in our published British Application No. 2425992A.

Where insolubility of the microparticles is achieved through crosslinking, by whichever method, it is preferred that the degree of crosslinking should not be greater than that necessary to render the polymer insoluble. As in the case of non-crosslinked microparticles, the monomer mixture to be polymerised may here include additionally one or more ethylenically unsaturated monomers not bearing functional groups, such as the acrylic monomers and others listed above.

In those cases where the crosslinking of the microparticles is effected by means of a difunctional or polyfunctional comonomer, or by means of a pair of comonomers carrying mutually condensable groups, as mentioned above, it is preferred that the monomer mixture which is polymerised in the process of the invention comprises:

(i) from 10% to 40% by weight of styrene or a homologue thereof;

(ii) from 2% to 30% by weight of the maleic acid or fumaric acid derivative as hereinabove defined;

(iii) from 0.2% to 10% by weight of crosslinking monomer;

(iv) from 20% to 87.8% of one or more other ethylenically unsaturated monomers not falling within any of the categories (i) (ii) or (iii), the total monomers being 100%. The expression "crosslinking monomer" above refers to either a single comonomer or the combination of two mutually reactive comonomers, as the case may be.

In the case where crosslinking of the microparticles arises from use of a functional comonomer in conjunction with a reactive amino resin, the preferred monomer mixture comprises:

(i) from 10% to 40% by weight of styrene or a homologue thereof;

(ii) from 2% to 30% by weight of the maleic or fumaric acid derivative as hereinbefore defined;

(iii) from 1% to 20% by weight of a hydroxyl group-containing monomer;

(iv) from 1% to 5% by weight of a carboxyl group-containing monomer;

(v) from 5% to 86% by weight of one or more other ethylenically unsaturated monomers not falling within any of the categories (i) to (iv), the total monomers being 100%, and the amount of the amino resin is from 0.5% to 20% of the total weight of the monomer mixture.

Aliphatic hydrocarbon liquids which are suitable for use in the process of the invention include hexane, heptane and commercially available petroleum fractions of various boiling point ranges; the latter may contain minor proportions of aromatic hydrocarbons.

The steric stabiliser used in the process, as defined above, is an amphipathic substance such as is conventionally employed in non-aqueous dispersion polymerisation procedures (see "Dispersion Polymerisation in Organic Media" ed. K. E. J. Barrett John Wiley & Sons, 1975). The type of stabilising agent preferred for use in the invention is a block or graft copolymer containing two types of polymeric component: one type consists, as stated above, of polymer chains which are solvatable by the dispersion liquid and the other type consists of polymer chains of different polarity from the first type which accordingly are not solvatable by that liquid and are capable of becoming anchored to the polymer microparticles.

A particularly useful form of such a stabilising agent is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly(12-hydroxystearic acid) which are readily solvatable by an aliphatic hydrocarbon medium. These copolymers may be made, for example, by first reacting poly(12-hydroxystearic acid) with glycidyl acrylate or glycidyl methacrylate, whereby the terminal -COOH group in the polymeric acid is converted to an ester derivative containing a polymerisable unsaturated grouping, and then copolymerising that derivative with methyl methacrylate, optionally together with minor proportions of other copolymerisable monomers By employing acrylic acid or methacrylic acid as such minor comonomers, it is possible to introduce carboxyl groups into the backbone chain of the graft copolymer with beneficial results inasmuch as the backbone is thereby rendered more polar than it is if composed of methyl methacrylate units alone. This increased polarity causes the backbone to be even less solvatable by a non-polar diluent such as an aliphatic hydrocarbon, and in consequence enhances the forces whereby it becomes anchored to the microparticles.

Further details concerning suitable stabilising agents and concerning dispersion polymerisation in general, are given in the reference quoted above and in the patent literature, for example in British Specification Nos. 941,305; 1,052,241; 1,122,397 and 1,231,614. It is, however, as already indicated, an essential feature of the process that the monomer mixture to be polymerised is added gradually to the hydrocarbon reaction medium so that the concentration of free monomer in it is kept low and the medium remains a non-solvent for the copolymer which is being formed. The preferred polymerisation procedure is that frequently referred to as a "seed and feed" process, in distinction to the "one-shot" process mentioned above. As discussed in the reference "Dispersion Polymerisation in Organic Media" at pages 207–208, this process is characterised by the initial production of a very dilute dispersion of fine "seed" particles of polymer by "one-shot" polymerisation of a small proportion only of the total monomer, followed by the gradual feeding in of the bulk of the monomer over an extended period of time. Under these conditions, the standing free monomer concentration in the polymerising mixture, and hence its solvency, can be kept reasonably constant. If desired, the initial small monomer charge from which the "seed" polymer is produced may have a composition different from that of the main monomer charge.

The inclusion in the mixture to be polymerised of the derivative of maleic acid or fumaric acid as defined above has two advantageous consequences. Firstly it increases the rate of polymerisation as compared with monomer mixtures containing styrene but not containing one of the derivatives in question; the quality of the polymer dispersion obtained, in particular the particle size, is thereby improved. Secondly, as already mentioned, where the derivatives themselves contain one or more aromatic nuclei in the molecule, these lead to further enhancement of the refractive index of the disperse polymer beyond that due to the styrene incorporated; consequently the amount of styrene required, in order to achieve a given level of refractive index, can be reduced.

Polymer microparticles made in dispersion by the process described above may be incorporated into any coating composition based on a film-forming polymer or resin.

Thus according to a further aspect of the present invention there is provided a coating composition comprising a liquid diluent and film-forming constituents which comprise:

(i) a film-forming polymer, (ii) polymer microparticles made in dispersion by the process hereinbefore defined.

Any of the film-forming resins conventionally used in coating compositions may be employed. The resin may be of either the crosslinking or the non-crosslinking type, that is to say the coating composition may be either thermosetting or themoplastic in nature.

One class of coating composition of interest is that of the thermosetting acrylic resins, including those which are known to be useful in compositions intended for automotive applications. Such resins are typically derived from one or more acrylic esters such as methyl methacrylate, ethyl methacrylate, propyl methacrylate, butyl methacrylate, ethyl acrylate, butyl acrylate and 2-ethylhexyl acrylate together with suitable other monomers carrying functional groups whereby the resin can subsequently be crosslinked through reaction with an amino resin, such as acrylic acid, methacrylic acid, hydroxyethyl acrylate, hydroxyethyl methacrylate, 2-hydroxypropyl acrylate, 2-hydroxypropyl methacrylate, N-(alkoxymethyl)acrylamides and N-(alkoxymethyl)methacrylamides (where the alkoxy group may be, for example, a butoxy group), glycidyl acrylate and glycidyl methacrylate. Such functional monomers typically constitute from 5% to 30% by weight of the total acrylic resin. The acrylic resin may also include minor proportions of other, copolymerised monomers such as vinyl acetate, vinyl propionate and acrylonitrile. In particular, as is common practice where resins for automotive use are concerned, they may include also from 5% to 40% by weight, based on the total resin, of styrene; the present invention is especially valuable in these circumstances, on account of the enhancement of the refractive index of the resin which the presence of the styrene brings about. These thermosetting acrylic resins may be crosslinked in conventional fashion, after application of the composition to a substrate, by the action of heat in conjunction with an amino resin crosslinking agent also present in the composition. The crosslinking agent may be any of the known materials of this type, that is to say a condensate of formaldehyde with a nitrogenous compound such as melamine, urea or benzoguanamine, or such a condensate in which a substantial proportion of the methylol groups present have been etherified by reaction with a lower alcohol, in particular butanol. The amount of the crosslinking agent is typically from 20% to 50% of the weight of the thermosetting acrylic resin taken.

Instead of being a thermosetting acrylic resin, the film-forming material in the coating composition may be a thermoplastic acrylic resin derived from any of the monomers referred to above but excluding those carrying functional groups.

As a further alternative, the film-forming material may be an alkyd resin derived in the usual way by the condensation of one or more polyhydric alcohols and one or more polycarboxylic acids and incorporating the residues of a drying oil or semi-drying oil fatty acid, whereby the resin cures by means of an autoxidation polymerisation mechanism. Yet again, it may be a polyester derived from similar polyfunctional starting materials but not incorporating any autoxidisable residues, in which case curing of the resin is effected by reaction of residual hydroxyl and/or carboxyl groups therein with an amino resin crosslinking agent.

For incorporation into the coating composition, the polymer microparticles may first of all be separated from the dispersion in which they are produced, e.g. by evaporation or centrifugation, and then blended with the other constituents of the composition. In many cases, however, it is possible to blend the dispersion of the microparticles directly with the other constituents. The continued stability of the polymer microparticles after their incorporation into a coating composition may be enhanced if the microparticles as described above are further associated, before their introduction into the composition, with a further, essentially non-crosslinked, polymer which is soluble in the continuous phase liquid, or diluent, of the composition and which is also compatible with the film-forming polymer present therein. This non-crosslinked polymer which may be referred to as "auxiliary" polymer, is most conveniently brought into association with the microparticles by following up the dispersion polymerisation process, after conversion of monomer and crosslinking, if any, are complete, directly with the polymerisation of further monomer, from which the auxiliary polymer is to be derived, in the original aliphatic hydrocarbon medium and in the presence of the original dispersion stabiliser (although further stabiliser may be added, if desired). Monomers from which the auxiliary polymer may be derived include the acrylic monomers and other "neutral" monomers referred to above in connection with the microparticles proper, but crosslinking monomers are, of course, omitted. It will be apparent to those skilled in the art which monomers to use in order to produce a non-crosslinked polymer having the required solubility characteristics.

The proportion of the polymer microparticles which is incorporated into the coating composition can vary widely, depending upon the nature of the microparticles and of the main film-forming material respectively, and upon the effect which it is desired to achieve. Thus, different proportions may be required in a particular case according to whether the microparticles are introduced in order to modify the rheological properties of the coating composition and hence influence its flow characteristics when applied to a substrate, or whether they are incorporated in order to modify the mechanical properties of the coating film after application.

The coating composition may, when appropriate, incorporate a suitable catalyst for the crosslinking reaction between the film-forming material and a crosslinking agent, for example an acid-reacting compound such as acid butyl maleate, acid butyl phosphate or p-toluene sulphonic acid. Alternatively the catalytic action may be supplied by the incorporation of free acid groups in the film-forming material, for example by the use of acrylic acid or methacrylic acid as a comonomer in the preparation of a crosslinkable acrylic polymer.

The coating composition may contain one or more pigments. As already mentioned, the invention is of particular interest in connection with compositions which contain pigments of a light-absorbing character (as contrasted with those which scatter light), including such compositions which additionally contain aluminium flakes and are intended for the production of "glamour metallic" type finishes on car bodies. The invention is, however, of greatest benefit with respect to non-pigmented, "clear" compositions which are normally applied over lightly pigmented metallic-type basecoats. In this case, the possibility according to the invention of matching the refractive index of the polymer microparticles exactly to that of the film-forming resin, and thus preserving the high clarity of the unmodified resin, is a very significant advantage.

The selection of the precise monomer formulation to be used in making polymer microparticles according to the invention, in order to match the refractive index of a particular film-forming resin, is a matter of simple experimentation which can be carried out without difficulty by a person skilled in the coating polymer art.

The invention is illustrated but not limited by the following Examples in which parts, ratios and percentages are by weight.

EXAMPLES 1–5 AND COMPARATIVE EXAMPLES A–C

To a vessel fitted with stirrer, thermometer, reflux condenser and provision for adding a liquid feed to the returning condensate there was charged:
Aliphatic hydrocarbon (boiling range 170°–210° C.; aromatic content 5%): 10.355 parts
Hexane: 2.536 parts
Heptane: 13.561 parts
The vessel and charge were purged with inert gas and then raised to reflux temperature (100° C.). The following premix ingredients were added over a short period of time:
Methyl methacrylate: 0.833 part
Methacrylic acid: 0.017 part
Azodiisobutyronitrile: 0.066 part
Graft copolymer stabiliser (33% solution as described below): 0.310 part
The contents of the vessel were then held under reflux for 30 minutes to form a 'seed' dispersion after which the following premixed ingredients were fed into the hydrocarbon returning from the condenser at a uniform rate over a period of 3 hours:
Monomer mixture as given in detail below: 16.145 parts
Azodiisobutyonitrile: 0.212 part
Graft copolymer stabiliser (33% solution as described below): 3.330 parts
Dimethylaminoethanol: 0.031 part
After completion of the monomer feed the reaction mixture was maintained under reflux for 3 hours.

The monomer mixture used in the feed stage in these Examples and Comparative Examples had the compositions indicated in the accompanying Table I; the first figure in each case is the amount in parts by weight and the second figure (in parentheses) indicates the weight percentage of the monomer in question in the total feed stage monomer mixture.

In each case a fine stable dispersion of crosslinked polymer microparticles was obtained. The dispersions had solids contents in the range 38–40%. (determined by evaporation at 150° C. for 1 hour) and insoluble gel contents in the range 21–31%. The volume average particle size of the microparticles was measured in each case by their Brownian motion and autocorrelation of laser light: the sizes found are also recorded in Table I. Prior to being cooled from the reaction temperature each dispersion was diluted finally with 12.549 parts of xylene.

The graft copolymer stabiliser solution used in the above procedure was obtained as follows. 12-Hydroxystearic acid was self-condensed to an acid value of about 31–34 mg KOH/g (corresponding to a molecular weight of 1650–1800) and then reacted with an equivalent amount of glycidyl methacrylate. The resulting unsaturated ester was copolymerised at a weight ratio of 2:1 with a mixture of methyl methacrylate and acrylic acid in the proportions of 95:5. The copolymer was used as a 33% solution in a mixture of aliphatic hydrocarbon, toluene and ethyl acetate in the ratio 74:14:12.

TABLE I

| EXAMPLE No. | 1 | 2 | 3 | 4 | 5 | A | B | C |
|---|---|---|---|---|---|---|---|---|
| Methyl methacrylate | 8.606(53.3) | 8.606(53.3) | 8.606(53.3) | 8.606(53.3) | 8.606(53.3) | 15.823(48.0) | 10.979(68.0) | 7.750(48.0) |
| Styrene | 4.844(30.0) | 4.844(30.0) | 4.844(30.0) | 4.844(30.0) | 4.844(30.0) | — | 5.099(30.0) | 8.498(50.0) |
| Glycidyl methacrylate | 0.161(1.00) | 0.161(1.00) | 0.161(1.00) | 0.161(1.00) | 0.161(1.00) | 0.161(1.00) | 0.161(1.00) | 0.161(1.00) |
| Methacrylic acid | 0.161(1.00) | 0.161(1.00) | 0.161(1.00) | 0.161(1.00) | 0.161(1.00) | 0.161(1.00) | 0.161(1.00) | 0.161(1.00) |
| Diethyl-fumarate | 2.373(14.7) | — | — | — | — | — | — | — |
| Dibutyl-maleate | — | 2.373(14.7) | — | — | — | — | — | — |
| Diiso-octyl maleate | — | — | 2.373(14.7) | — | — | — | — | — |
| Dibenzyl maleate | — | — | — | 2.373(14.7) | — | — | — | — |
| N—o-Chlorophenyl maleimide | — | — | — | — | 2.373(14.7) | — | — | — |
| VOLUME AVERAGE PARTICLE SIZE, | 250 | 260 | 270 | 290 | 260 | 270 | 570 | 470 |

TABLE I-continued

| EXAMPLE No. | 1 | 2 | 3 | 4 | 5 | A | B | C |
|---|---|---|---|---|---|---|---|---|
| nm. | | | | | | | | |

The results of particle size determination given in Table I illustrate the fact that the use of styrene as a comonomer in the absence of a maleic acid or fumaric acid derivative as required according to the present invention leads to the production of relatively coarse particles in dispersion which in turn cause the dispersion to sediment out rapidly on storage. The process of the invention, on the other hand, yields dispersions of similar particle size to those obtained with acrylic monomers only (i.e. omitting styrene).

EXAMPLE 6 AND COMPARATIVE EXAMPLES D-G

Thermosetting acrylic coating compositions were prepared by blending a melamine-formaldehyde resin with an acrylic solution polymer having the composition: styrene 42.5%, butyl methacrylate 21.25%, butyl acrylate 21.25%, hydroxymethyl methacrylate 14.0% and acrylic acid 1%, together with (in all cases except one) a dispersion of insoluble microparticles prepared as described in one of the preceding Examples or Comparative Examples. Details of the particular microparticles used and of the proportion of the three constituents taken are given in the accompanying Table II; the amounts stated are in each case parts by weight based on 100% non-volatile material. Each blend was then thinned with a 1:1 mixture of butyl acetate and xylene to a spraying viscosity of 50-60 seconds (measured in a BS.B3 cup at 25° C.) and sprayed on to glass panels which were afterwards stoved for 30 minutes at 127° C. The appearance of the resulting film was then noted: the results are recorded also in Table II.

TABLE II

| Example No. | 6 | D | E | F | G |
|---|---|---|---|---|---|
| M/F resin | 30 | 30 | 30 | 30 | 30 |
| Acrylic polymer | 60 | 60 | 60 | 60 | 70 |
| Microparticles from Example 4 | 10 | — | — | — | — |
| Comp. Ex. A | — | 10 | — | — | — |
| Comp. Ex. B | — | — | 10 | — | — |
| Comp. Ex. C | — | — | — | 10 | — |
| Appearance of film | clear | very cloudy | slightly cloudy | clear | clear |

The above results demonstrated that the inherent clarity of the cured acrylic film (Comparative Example G) is lost if microparticles which are not matched to its refractive index are introduced, i.e. microparticles containing a zero or low proportion of styrene (Comparative Examples D & E). Clarity of the film is maintained if the microparticles contain a high proportion of styrene (Comparative Example F) but this, as is demonstrated by the results presented in the previous group of Examples, is done at the expense of the microparticles being of a coarse size and consequently prone to settlement from dispersion. In contrast, the use of styrene in conjunction with a maleic acid or fumaric acid derivative according to the invention, as shown by Example 6, enables clarity of the film to be preserved without such accompanying drawbacks.

EXAMPLES 7-8 AND COMPARATIVE EXAMPLE H (a) To a vessel fitted with stirrer, thermometer, reflux condenser and Dean and Stark separator, there was charged:
Aliphatic hydrocarbon (boiling range 140°-156° C.; zero aromatic content): 25.735 parts
Methyl methacrylate: 1.341 parts
Methacrylic acid: 0.026 part
Azodiisobutyronitrile: 0.107 part
Graft copolymer stabiliser (33% solution, as described below): 0.497 part
The vessel and charge were purged with inert gas and the temperature raised to 100° C. and maintained there for 30 minutes in order to produce a 'seed' polymer dispersion. The following pre-mixed ingredients were then fed into the vessel at a uniform rate over a period of 3 hours, maintaining the temperature at 100° C. with stirring:
Monomer, as given in detail below: 19.877 parts
Hydroxyethyl acrylate: 1.130 parts
Hexamethoxymethylmelamine: 1.130 parts
Methacrylic acid: 0.451 part
Azodiisobutyronitrile: 0.140 part
Graft copolymer stabiliser (33% solution, as described below): 4.664 parts
Aliphatic hydrocarbon, (as described above): 11.320 parts The reaction mixture was then held at 100° C. for a further period of 30 minutes, after which the temperature was raised to 140°-145° C. when recycling of distillate commenced; these conditions were maintained for 2 hours, during which 1.2 parts of water were removed at the separator. The contents of the vessel were then cooled to give a fine dispersion of crosslinked microparticles. The dispersions had solids contents in the range 38-39%, insoluble gel contents in the range 31-32% and particle sizes (determined from electron micrographs) ranging from 70 to 300 nm.

The graft copolymer stabiliser used in the foregoing procedure was obtained as follows: 12-hydroxystearic acid was self-condensed to an acid value of about 31-34 mg KOH/g (corresponding to a molecular weight of 1650-1800) and was then reacted with an equivalent amount of glycidyl methacrylate. The resulting unsaturated ester was copolymerised with methyl methacrylate and glycidyl methacrylate in the weight ratios 49:46:5 respectively, and the copolymer thus obtained was finally reacted with methacrylic acid and p-nitrobenzoic acid in the presence of a tertiary amine catalyst, in the proportions of 0.070 part of methacrylic acid and 0.019 part of p-nitrobenzoic acid for every 100 parts of the copolymer.

(b) To a vessel fitted as described in step (a) above, but fitted with provision for adding a liquid feed into the recycling distillate, there was charged 66.418 parts of the dispersion obtained in step (a). The dispersion was heated to 145° C. to establish recycling of distillate, and the following premixed ingredients were then fed in via the returning distillate at a steady rate over a period of 3 hours:

Reaction product of poly(12-hydroxystearic acid) and glycidyl methacrylate, (50% solution in aliphatic hydrocarbon, boiling range 136°–165° C.): 14.982 parts
Hydroxyethyl acrylate: 1.972 parts
Methacrylic acid: 0.394 part
Styrene: 5.193 parts
Methyl methacrylate: 3.943 parts
Di-tert-butyl peroxide: 0.394 part
Graft copolymer stabiliser (33% solution, as described in (a), above): 5.984 parts.

When the feed was complete, the reaction mixture was held at recycle temperature for 3 hours. The resulting dispersions of crosslinked microparticles, modified with non-crosslinked auxiliary polymer, had solids contents in the range 47–48% and insoluble gel contents in the range 29–30%.

The monomer used in the feed stage of step (a) of the above procedure in these Examples and Comparative Example had the composition shown in the accompanying Table III; the first figure in each case represents the parts by weight of each monomer taken, the second figure (in parentheses) the weight percentage of the monomer in question in the total monomers used in the feed stage.

TABLE III

| Example No. | 7 | 8 | H |
|---|---|---|---|
| Methyl methacrylate | 16.283(72.0) | 15.085(66.8) | 19.877(88.0) |
| N—o-Chlorphenyl-maleimide | 2.396(10.6) | 2.396(10.6) | — |
| Styrene | 1.198(5.3) | 2.396(10.6) | — |

EXAMPLES 9–10 AND COMPARATIVE EXAMPLE J

Air-drying alkyd coating compositions were prepared by blending a 52% tall oil-modified alkyd resin from pentaerythritol, p-tert-butylbenzoic acid, benzoic acid and phthalic anhydride with a dispersion of insoluble microparticles prepared as described in one of Examples 7 or 8 or Comparative Example H; the two constituents were blended in the ratio of 90 parts to 10 parts of non-volatile material respectively. Each blend was thinned to a viscosity of 24 seconds (measured in a B.S B3 cup at 25° C.) with a solvent consisting of aliphatic hydrocarbon, boiling range 138°–165° C., 95 parts, nonanol 5 parts, and mixed terpene alcohols 1 part. The blends were sprayed on to glass panels, allowed to dry overnight and the appearance of the resulting film then noted. The particular microparticles used, and the film appearance in each case are recorded in Table IV below.

TABLE IV

| Example No. | 9 | 10 | J |
|---|---|---|---|
| Microparticles from | Ex. 7 | Ex. 8 | Comp. Ex. H |
| Appearance of film | slightly cloudy | clear | very cloudy |

EXAMPLE 11

A. To a vessel fitted with a stirrer, thermometer, provision for adding a liquid feed directly to the vessel, and a reflux condenser, there was charged:
Aliphatic hydrocarbon (boiling range 138°–158° C.; aromatic content 0.05%: 16.179 parts
Aliphatic hydrocarbon (boiling range 201°–243° C.; aromatic content 0.5%): 6.549 parts The vessel and charge were purged with inert gas and then heated to 100° C. The following premixed ingredients were added over a short period of time:
Methyl methacrylate: 1.185 parts
Methacrylic acid: 0.025 part
Azodiisobutyronitrile: 0.094 part
n-Octyl mercaptan: 0.014 part
Graft copolymer stabiliser (33% solution as described in Examples 7 to 8): 0.440 part The contents of the vessel were then held at a temperature of 100° C. for 30 minutes to form a "seed" dispersion, after which the inert gas flow was changed from a purge to a "blanket". The following premixed ingredients were then fed directly to the vessel at a uniform rate over 3 hours, maintaining a temperature of 100° C. throughout:
Monomer mixture as given in detail below: 19.956 parts
Azodiisobutyronitrile: 0.124 part
Graft copolymer stabiliser (33% solution as above): 4.125 parts
Aliphatic hydrocarbon (boiling range 138°–158° C., as described above): 10.014 parts
Dimethylaminoethanol: 0.038 part After completion of the monomer feed, the reaction mixture was maintained at 100° C. for 30 minutes and then heated further to 120° C., this temperature being maintained for a further 2 hours.

The monomer mixture used was:
Methyl methacrylate: 13.408 parts
Monobenzyl maleate: 3.174 parts
Styrene: 3.174 parts
Glycidyl methacrylate: 0.200 part A fine stable dispersion of crosslinked polymer microparticles was obtained. The dispersion had a solids content in the range 38–40% (determined by evaporation at 150° C. for 1 hour) and insoluble gel content in the range 21–31%. The volume average particle size of the microparticles was measured by their Brownian motion and autocorrelation of laser light, and found to be 150–260 nm.

B. To a vessel fitted as described in step A above, there was charged 58.743 parts by weight of the dispersion in step A and 6.616 parts of xylene. The dispersion was heated to 120° C. and the following premixed ingredients were then fed directly to the vessel at a steady rate over a period of 3 hours:
Graft copolymer stabiliser (33% solution as described above): 1.323 parts
Hydroxyethyl acrylate: 1.754 parts
Methacrylic acid: 0.175 part
Styrene: 5.253 parts
Methyl methacrylate: 3.354 parts
Butyl methacrylate: 3.396 parts
Ethylhexyl acrylate: 3.506 parts
Xylene: 9.754 parts
Tertiary butylperoxyisopropyl carbonate: 0.348 part When the feed was complete, the reaction mixture was held at 120° C. for 3 hours, then cooled and butyl cellosolve (5.778 parts) added. The resulting dispersion of crosslinked microparticles, modified with non-crosslinked auxiliary polymer, had a solids content in the range 38–40% and insoluble gel content in the range 21–31%.

C. A thermosetting acrylic coating composition was prepared by blending a melamine-formaldehyde resin with an acrylic solution polymer having the composition styrene 42.5%, butyl methacrylate 21.25%, butyl acrylate 21.25%, hydroxyethyl methacrylate 14% and acrylic acid 1%., together with a dispersion of insoluble microparticles prepared as described in each of the preceding sections A and B. The proportion of the three constituents in each case was 30:60:10 parts by weight, based on 100% non-volatile content. The blends were thinned, with a 1:1 mixture of butyl acetate and xylene, to a spraying viscosity of 50-60 seconds (measured in a BS B3 cup at 25° C.) and sprayed on to glass panels which were afterwards stoved for 30 minutes at 127° C. Both films were clear, comparable in appearance to a film prepared from a 30:70 blend of the melamine-formaldehyde resin and the acrylic resin above.

EXAMPLE 12

A. The procedure described in part A of Example 11 was repeated, except that the amount of monomer mixture used in the "feed" stage was 19.994 parts and the dimethylaminoethanol was omitted. The monomer mixture used in this case was of the following composition:

| Methyl methacrylate | 12.646 parts | (68.2) |
|---|---|---|
| Monobenzyl maleate | 3.174 parts | (15.9) |
| Styrene | 3.174 parts | (15.9) |
| Diallyl phthalate | 1.000 parts | (5.0) |
| | 19.994 | (100.0) |

The figures in parentheses above indicate the weight percentage of each monomer in the monomer mixture.

A fine stable dispersion of crosslinked polymer microparticles was obtained, having a solids content in the range 38-40% (determined by evaporation at 150° C. for 1 hour). The volume average particle size of the microparticles, measured by their Brownian motion and autocorrelation of laser light, was 210-320 nm.

B. The procedure described in part B of Example 11 was repeated, using the microparticle dispersion obtained according to part A set out above.

The resulting dispersion of crosslinked microparticles, modified with non-crosslinked auxiliary polymer, had a solids content in the range 38-40% and insoluble gel content in the range 20-30%.

EXAMPLE 13

A. The procedure described in part A of Example 11 was repeated, except that the amount of monomer mixture used in the "feed" stage was 19.994 parts and the dimethylaminoethanol was omitted. The monomer mixture used in this case had the following composition:

| Methyl methacrylate | 13.434 parts | (67.2) |
|---|---|---|
| Monobenzyl maleate | 3.174 parts | (15.9) |
| Styrene | 3.174 parts | (15.9) |
| Allyl methacrylate | 0.212 part | (1.0) |
| | 19.994 | (100.0) |

The figures in parentheses above indicate the weight percentage of each monomer in the monomer mixture.

A fine stable dispersion of crosslinked polymer microparticles was obtained, having a solids content in the range 33-40% (determined by evaporation at 150° C. for 1 hour). The volume average particle size of the microparticles, measured by their Brownian motion and autocorrelation of laser light, was 200-300 nm.

B. The procedure described in part B of Example 11 was repeated, using the microparticle dispersion obtained according to part A set out above.

The resulting dispersion of crosslinked microparticles, modified with non-crosslinked auxiliary polymer, had a solids content in the range 38-40% and insoluble gel content in the range 21-31%.

COMPARATIVE EXAMPLE K

The procedure described in Example 4 of U.S. Pat. No. 3,232,903 was repeated, as follows:

To a vessel fitted with a thermometer, stirrer, reflux condenser, a means of adding liquid directly to the vessel, and a means by which inert gas could be introduced either below or above the liquid level there was charged:

Lauryl methacrylate: 10 parts
Benzoyl peroxide (60% in dimethyl phthalate): 0.17 part
Technical heptane: 75 parts The vessel and charge were then purged with nitrogen whilst the charge was raised to reflux temperature. Nitrogen was then introduced only above the boiling liquid whilst refluxing was continued for 1 hour, and then 40 parts of methyl methacrylate was added all at once. An initial drop in temperature of 17° C. occurred; after 10 minutes (during which time reflux was re-established) a white dispersion was seen to form. After a further 5 hours at reflux temperature conversion of the monomer, (as determined by evaporation of a sample of the reaction mixture at 150° C. for 1 hour) was found to be greater than 98%. A continuous film was produced by casting of the dispersion and drying at 100° C. The particle size of the dispersion (as determined by photomicrography) ranged between 2000 and 3000 nm and the particles were uniformly of a spherical shape.

COMPARATIVE EXAMPLE L

The procedure described in Comparative Example K was repeated, except that the 40 parts of methyl methacrylate was replaced by a mixture of 28 parts of methyl methacrylate and 12 parts of styrene.

The product obtained at the end of the 5-hour refluxing period smelled strongly of styrene monomer and the conversion of monomer to polymer was found to be less than 40%. A cast film of the dispersion did not coalesce. The particle size of the dispersion (as determined by photomicrography) ranged widely from below 1000 to 6000 nm, and the larger particles were very irregular in shape.

COMPARATIVE EXAMPLE M

The procedure described in Comparative Example K was repeated, except that the 40 parts of methyl methacrylate was replaced by a mixture of 39.2 parts of methyl methacrylate, 0.4 part of methacrylic acid, 0.4 part of glycidyl methacrylate and 0.075 part of dimethylaminoethanol.

Within 10 minutes of reflux being re-established after addition of the monomer charge, the reaction mixture was seen to contain large particles of polymer which were precipitating on to the walls of the vessel. During the following 3 hours at reflux, a progressively thicker coating of polymer on the vessel walls was formed and the experiment was then abandoned. Over 33 parts of insoluble residue was recovered from the reaction mixture.

The results of Comparative Examples K-M show the unsuitability of the "one-shot" type of polymerisation process when a fine particle-size polymer dispersion is required, particularly when the monomers to be polymerised include either styrene or functional monomers capable of giving rise to a cross-linked polymer.

We claim:

1. A process for the production of a dispersion of addition polymer microparticles, of a size in the range 100-400 nm, the process comprising the dispersion polymerization in an aliphatic hydrocarbon liquid of an ethylenically unsaturated monomer mixture which gives rise to a copolymer insoluble in the hydrocarbon liquid and which comprises (i) up to 50% by weight of styrene or a substituted derivative thereof and (ii) up to 50% by weight of a derivative of maleic acid or fumaric acid which is per se soluble in the hydrocarbon liquid at the temperature of polymerization, said derivative being selected from the group consisting of an N-aryl-substituted maleimide of the general formula

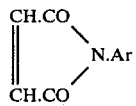

where Ar is an aromatic radical which may contain a single benzene nucleus or two or more connected or fused benzene nuclei, a diester of maleic acid or fumaric acid of the structure

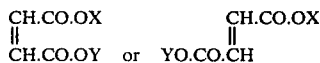

where either X or Y, or both, is an aromatic radical which may contain a single benzene nucleus or two or more connected or fused benzene nuclei, and a monoester of maleic acid or fumaric acid of the structure

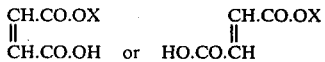

where X is an aromatic radical which may contain a single benzene nucleus or two or more connected or fused benzene nuclei, the polymerization being carried out in the presence in the hydrocarbon liquid of a steric dispersion stabilizer the molecule of which comprises at least one polymeric component which is solvated by the hydrocarbon liquid and at least one other component which is not solvated by the liquid and is capable of associating with the copolymer produced, and the concentration of unpolymerized monomer in the hydrocarbon liquid being regulated so that throughout the polymerization the reaction medium remains a non-solvent for the copolymer formed.

2. A process as claimed in claim 1, wherein the derivative is an N-aryl-substituted maleimide of the general formula

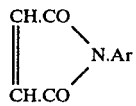

where Ar is an aromatic radical which may contain a single benzene nucleus or two or more connected or fused benzene nuclei.

3. A process as claimed in claim 2, wherein the derivative is N-o-chlorophenylmaleimide.

4. A process as claimed in claim 1, wherein the derivative is a diester of maleic acid or fumaric acid of the structure

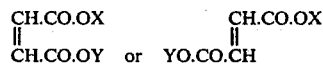

where either X or Y, or both, is an aromatic radical which may contain a single benzene nucleus or two or more connected or fused benzene nuclei.

5. A process as claimed in claim 5, wherein the derivative is dibenzyl maleate.

6. A process as claimed in claim 1, wherein the derivative is a monoester of maleic acid or fumaric acid of the structure

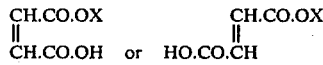

where X is an aromatic radical which may contain a single benzene nucleus or two or more connected or fused benzene nuclei.

7. A process as claimed in claim 6, wherein the derivative is monobenzyl maleate.

8. A process as claimed in any one of claims 1 and 2 to 7, wherein the dispersed addition polymer microparticles are crosslinked and wherein the monomer mixture being polymerised comprises:
   (i) from 10% to 40% by weight of styrene or a homologue thereof;
   (ii) from 2% to 30% by weight of the maleic acid or fumaric acid derivative;
   (iii) from 0.2% to 10% by weight of at least one cross-linking monomer;
   (iv) from 20% to 87.8% of one or more other ethylenically unsaturated monomers not falling within any of the categories (i), (ii) or (iii), the total monomers being 100%.

9. A process as claimed in any of claims 1 and 2 to 7, wherein the dispersed addition polymer microparticles are crosslinked and, wherein the monomer mixture being polymerised comprises:
   (i) from 10% to 40% by weight of styrene or a homologue thereof;
   (ii) from 2% to 30% by weight of the maleic or fumaric acid derivative as hereinbefore defined;
   (iii) from 1% to 20% by weight of a hydroxyl group-containing monomer;
   (iv) from 1% to 5% by weight of a carboxyl group-containing monomer;
   (v) from 5% to 86% by weight of one or more other ethylenically unsaturated monomers not falling within any of the categories (i) to (iv), the total monomers being 100%
and the monomer mixture being polymerised in the presence of from 0.5% to 20%, based on the monomer mixture, of a reactive amino resin.

10. A process as claimed in any one of claims 1 and 2 to 7, wherein the stabilising agent is a graft copolymer comprising an acrylic polymer backbone, which is non-solvatable by the hydrocarbon liquid, and a plurality of polymer chains pendant from the backbone which are residues of poly(12-hydroxystearic acid) and are solvatable by the hydrocarbon liquid.

11. A coating composition comprising a liquid diluent and film-forming constituents which comprise:
   (i) a film-forming polymer;
   (ii) a dispersion of polymwer microparticles made by the process as claimed in any one of claims 1 and 2 to 7.

12. A coating composition as claimed in claim 11, wherein the polymer microparticles in the dispersion have been associated, before introduction of the dispersion into the composition, with an essentially non-crosslinked polymer which is soluble in the liquid diluent of the composition and is compatible with the film-forming polymer.

13. A process for the production of a dispersion of addition polymer microparticles, the process comprising the dispersion polymerization in an aliphatic hydrocarbon liquid of an ethylenically unsaturated monomer mixture which gives rise to a copolymer insoluble in the hydrocarbon liquid and which comprises (i) up to 50% by weight of styrene or a substituted derivative thereof and (ii) up to 50% by weight of a derivative of maleic acid or fumaric acid which is per se soluble in the hydrocarbon liquid at the temperature of polymerization, said derivative being selected from the group consisting of an N-aryl-substituted maleimide of the general formula

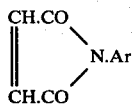

where Ar is an aromatic radical which may contain a single benzene nucleus or two or more connected or fused benzene nuclei, a diester of maleic acid or fumaric acid of the structure

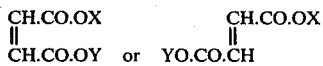

where either X or Y, or both, is an aromatic radical which may contain a single benzene nucleus or two or more connected or fused benzene nuclei, and a monoester of maleic acid or fumaric acid of the structure

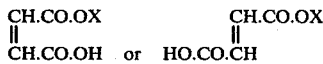

where X is an aromatic radical which may contain a single benzene nucleus or two or more connected or fused benzene nuclei, the polymerization being carried out in the presence in the hydrocarbon liquid of a steric dispersion stabilizer the molecule of which comprises at least one polymeric component which is solvated by the hydrocarbon liquid and at least one other component which is not solvated by the liquid and is capable of associating with the copolymer produced, and the concentration of unpolymerized monomer in the hydrocarbon liquid being regulated so that throughout the polymerization the reaction medium remains a non-solvent for the copolymer formed.

14. A process as claimed in claim 13, wherein the derivative is an N-aryl-substituted maleimide of the general formula

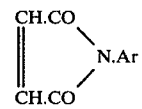

where Ar is an aromatic radical which may contain a single benzene nucleus or two or more connected or fused benzene nuclei.

15. A process as claimed in claim 14, wherein the derivative is N-o-chlorophenylmaleimide.

16. A process as claimed in claim 13, wherein the derivative is a diester of maleic acid or fumaric acid of the structure

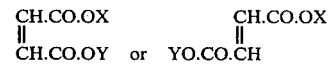

where either X or Y, or both, is an aromatic radical which may contain a single benzene nucleus or two or more connected or fused benzene nuclei.

17. A process as claimed in claim 16, wherein the derivative is dibenzyl maleate.

18. A process as claimed in claim 13, wherein the derivative is a monoester of maleic acid or fumaric acid of the structure

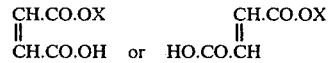

where X is an aromatic radical which may contain a single benzene nucleus or two or more connected or fused benzene nuclei.

19. A process as claimed in claim 18, wherein the derivative is monobenzyl maleate.

20. A process as claimed in any one of claims 13 and 14 to 19, wherein the dispersed addition polymer microparticles are crosslinked and, wherein the monomer mixture being polymerised comprises:
   (i) from 10% to 40% by weight of styrene or a homologue thereof;
   (ii) from 2% to 30% by weight of the maleic acid or fumaric acid derivative;
   (iii) from 0.2% to 10% by weight of at least one crosslinking monomer;
   (iv) from 20% to 87.8% of one or more other ethylenically unsaturated monomers not falling within any of the categories (i), (ii) or (iii), the total monomers being 100%.

21. A process as claimed in any one of claims 13 and 14 to 19, wherein the dispersed addition polymer microparticles are crosslinked and, wherein the monomer mixture being polymerised comprises:
   (i) from 10% to 40% by weight of styrene or a homologue thereof;
   (ii) from 2% to 30% by weight of the maleic or fumaric acid derivative as hereinbefore defined;
   (iii) from 1% to 20% by weight of a hydroxyl group-containing monomer;
   (iv) from 1% to 5% by weight of a carboxyl group-containing monomer;
   (v) from 5% to 86% by weight of one or more other ethylenically unsaturated monomers not falling within any of the categories (i) to (iv), the total monomers being 100%;

and the monomer mixture being polymerised in the presence of from 0.5% to 20%, based on the monomer mixture, of a reactive amino resin.

22. A process as claimed on any one of claims 13 and 14 to 19, wherein the stabilising agent is a graft copolymer comprising an acrylic polymer backbone, which is non-solvatable by the hydrocarbon liquid, and a plurality of polymer chains pendant from the backbone which are residues of poly(12-hydroxystearic acid) and are solvatable by the hydrocarbon liquid.

23. A coating composition comprising a liquid diluent and film-forming constituents which comprise:
 (i) a film-forming polymer;
 (ii) a dispersion of polymer microparticles made by the process as claimed in any one of claims 13 and 14 to 19.

24. A coating composition as claimed in claim 23, wherein the polymer microparticles in the dispersion have been associated, before introduction of the dispersion into the composition, with an essentially non-crosslinked polymer which is soluble in the liquid diluent of the composition and is compatible with the film-forming polymer.

* * * * *